United States Patent [19]

Geschonke et al.

[11] 4,128,516

[45] Dec. 5, 1978

[54] PROCESS FOR THE GENTLE DEGASIFICATION OF COAGULATION-SENSITIVE PVC LATICES

[75] Inventors: Hans Geschonke, Pulheim; Rainer Rompeltien; Wolfgang Rummel, both of Cologne, all of Germany

[73] Assignee: Wacker-Chemie GmbH, Munich, Germany

[21] Appl. No.: 813,663

[22] Filed: Jul. 7, 1977

[30] Foreign Application Priority Data

May 20, 1977 [DE] Fed. Rep. of Germany ....... 2722952

[51] Int. Cl.² .............................................. C08L 27/06
[52] U.S. Cl. .............................................. 260/29.6 R
[58] Field of Search .................... 528/500; 260/29.6 R

[56] References Cited

U.S. PATENT DOCUMENTS

| | | | |
|---|---|---|---|
| 2,467,769 | 4/1949 | Morrow et al. | 528/500 |
| 3,129,132 | 4/1964 | Gudheim | 260/29.6 R |
| 4,017,445 | 4/1977 | Grosse-Wortmann et al. | 528/500 |

*Primary Examiner*—Eugene C. Rzucidlo
*Attorney, Agent, or Firm*—Hammond & Littell

[57] ABSTRACT

In the process for the gentle degasification of coagulation-sensitive PVC latices in a confined space under reduced pressure and stirring at elevated temperatures with steam injection onto the latex surface, the improvement consisting essentially of conducting said degasification at a selected temperature from 50° C to 80° C at a pressure corresponding to the boiling pressure of water at the selected temperature, stirring said latex by an inclined stirrer whereby a rolling action of said latex in said confined space is effected and introducing said steam into the gas space above said latex but directed along the surface of the confined space.

11 Claims, 3 Drawing Figures

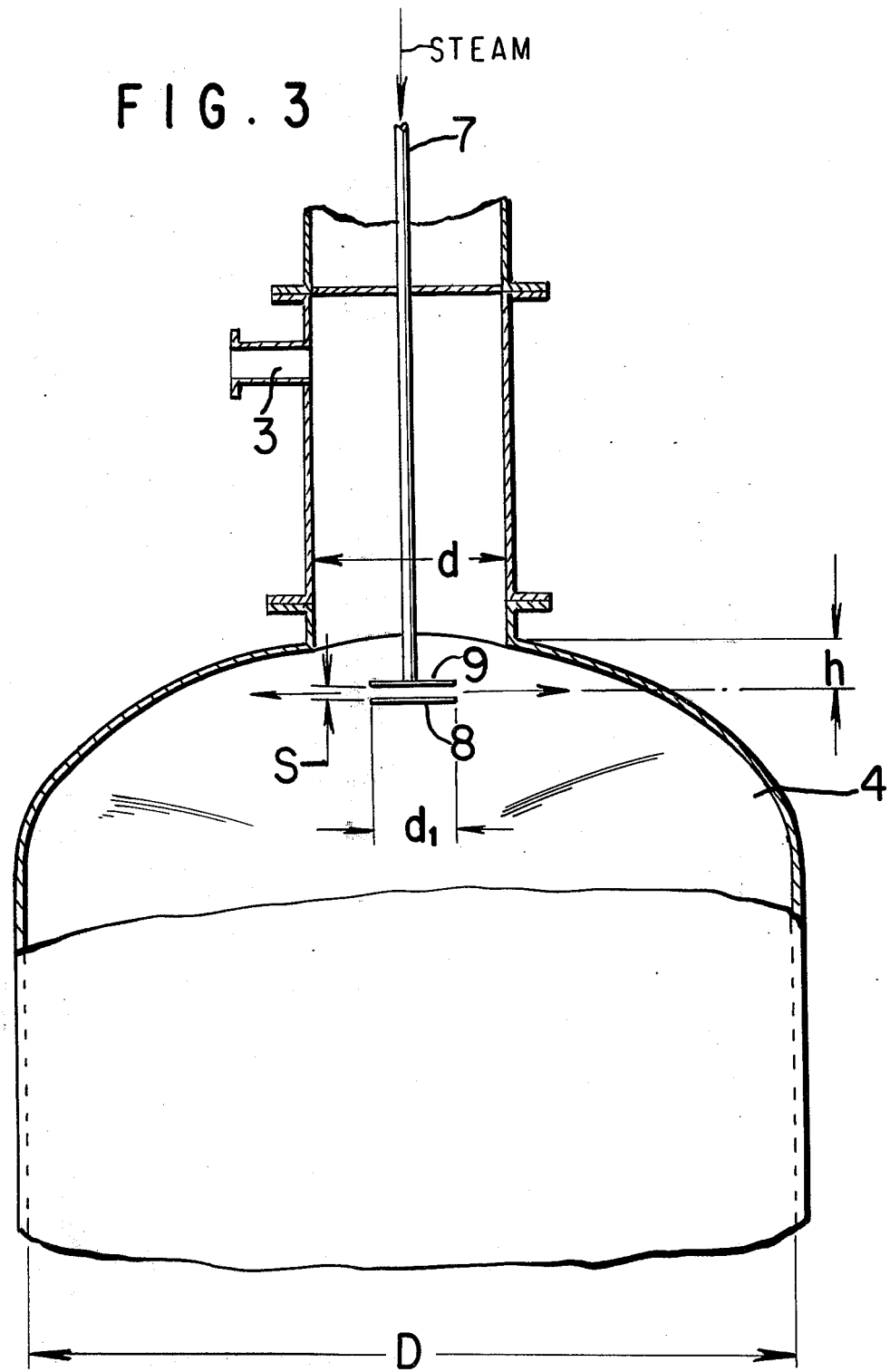

PROCESS FOR THE GENTLE DEGASIFICATION OF COAGULATION-SENSITIVE PVC LATICES

BACKGROUND OF THE INVENTION

During the polymerization of vinyl chloride to polyvinyl chloride under aqueous polymerization conditions, the entire amount of vinyl chloride is not converted quantitatively to polyvinyl chloride and a residual amount of vinyl chloride remains. This residual amount of vinyl chloride must be removed practically quantitatively from the aqueous polyvinyl chloride. Various methods have been suggested for this purpose; in particular, low vinyl chloride contents are achieved in the finished aqueous polyvinyl chloride after distilling off the vinyl chloride evaporating under a vacuum with the aid of a treatment with steam.

Special problems occur with coagulation-sensitive latices since high temperatures and high shearing load cause coagulation of the latices so that no usable product is obtained (further processing is practically impossible.) Therefore, the treatment with steam at elevated temperatures with agitation is difficult. Another problem is the large amount of foaming which occurs during the degasification. The use of anti-foaming agents has not been successful in this connection because the product quality is negatively affected by the anti-foaming agents, particularly if larger amounts have to be employed.

Heretofore, coagulation-sensitive latices could only be degased under extremely mild conditions in terms of temperature control, steam treatment, etc. But this means a great expenditure of time and frequently also unsatisfactory degasification values, that is, a high residual vinyl chloride content in the latex.

OBJECTS OF THE INVENTION

An object of the present invention is to provide a special process, particularly for coagulation-sensitive PVC latices, for the degasification of vinyl chloride from aqueous polyvinyl chlorides which decreases the necessary time expenditure and improves the degasification results.

Another object of the present invention is the improvement in the process for the gentle degasification of coagulation-sensitive PVC latices in a confined space under reduced pressure and stirring at elevated temperatures with steam injection onto the latex surface, the said improvement consisting essentially of conducting said degasification at a selected temperature from 50° C. to 80° C. at a pressure corresponding to the boiling pressure of water at the selected temperature, stirring said latex by an inclined stirrer whereby a rolling action of said latex in said confined space is effected and introducing said steam into the gas space above said latex but directed along the surface of the confined space.

These and other objects of the invention will become more apparent as the description thereof proceeds.

THE DRAWINGS

FIG. 3 is a detail of another embodiment of introducing steam into the vessel.

DESCRIPTION OF THE INVENTION

Figure 1:
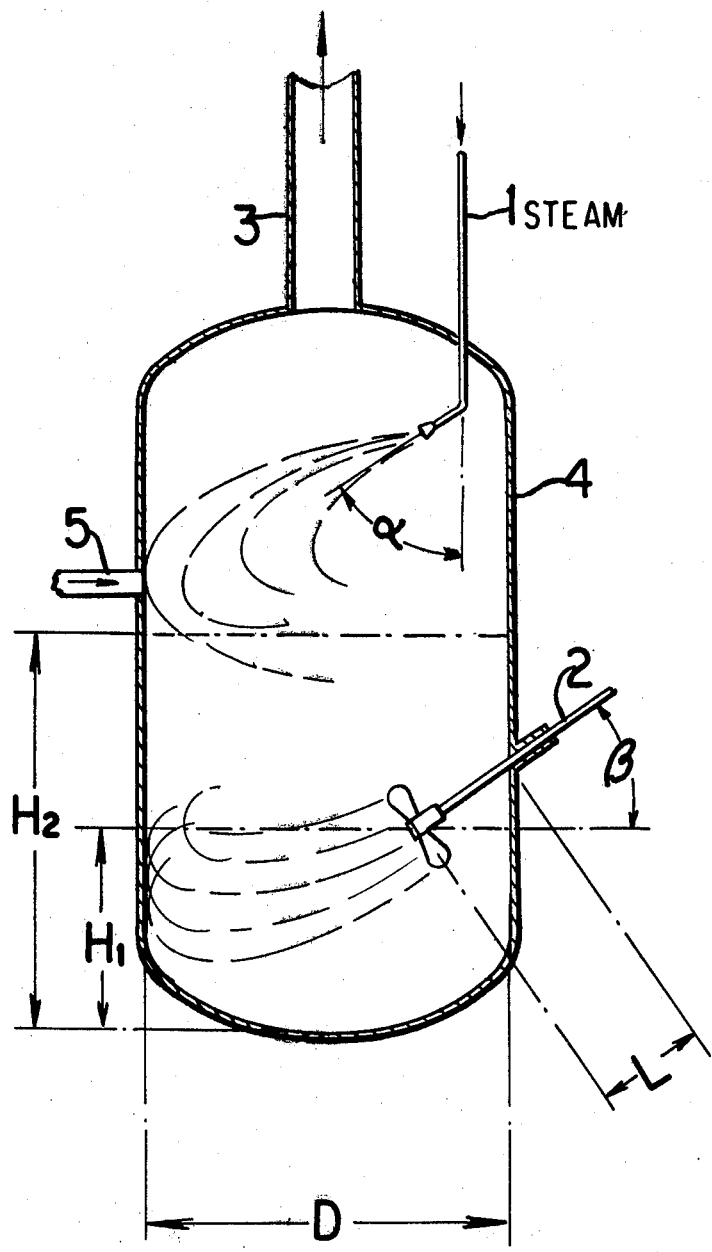
FIG. 1 is a cross-section of a degasification chamber illustrating the process of the invention.
Figure 2:
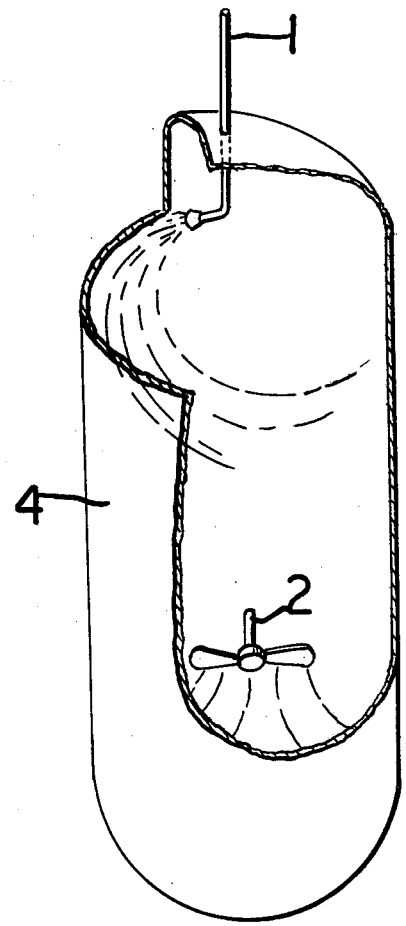
FIG. 2 is a partially cross-sectional perspective view of the degasification chamber illustrating the process of the invention.

The subject matter of the invention is a process for the gentle degasification of coagulation-sensitive PVC latices in a confined space by steam treatment under reduced pressure and stirring at elevated temperatures, which is characterized in (a) that the latex is kept at a selected temperature from 50° C. to 80° C. at a pressure corresponding to the boiling pressure of water at the selected temperature, (b) that the stirring of the latex is effected by an inclined stirrer in such a manner that a rolling action of the latex is effected and (c) that the steam is introduced into the gas space of the degasification tank above said latex but directed along the surface of the tank, such as being directed tangentially to the tank wall, and/or the steam is conducted centrally to a baffle plate in the degasification tank.

More particularly, the present invention is an improvement in the process for the gentle degasification of coagulation-sensitive PVC latices in a confined space under reduced pressure and stirring at elevated temperatures with steam injection onto the latex surface, the said improvement consisting essentially of conducting said degasification at a selected temperature from 50° C. to 80° C. at a pressure corresponding to the boiling pressure of water at the selected temperature, stirring said latex by an inclined stirrer whereby a rolling action of said latex in said confined space is effected and introducing said steam into the gas space above said latex but directed along the surface of the confined space.

The process according to the invention permits the achieving of extremely low residual PVC values with short degassing periods of 30 minutes, for example, to a maximum of 2 hours. Furthermore, annoying foaming is effectively prevented. Recovery of the vinyl chloride resulting from degassing is possible in a simple manner by condensers. Another advantage is that only a small amount of energy is required in the entire process. Completely surprising, furthermore, is the fact that a latex treated this way is easy to filter, which is of paramount importance in methods of working up the PVC.

Coagulation-sensitive latices are produced particularly in the so-called prehomogenization-polymerization process. The vinyl chloride is here subjected, together with the necessary adjuncts and catalysts (oil-soluble), to strong shearing forces prior to the polymerization so that a vinyl chloride/water-emulsion is formed, which is subsequently polymerized with only slight or no stirring at all. These latices have generally particle sizes of the finished polyvinyl chloride of 0.1 to 2μ. A description of this process is to be found in U.S. Pat. No. 3,696,079 from column 2, line 56 to column 4, line 5. These latices coagulate both under the influence of elevated temperatures and under the influence of shearing forces. Similarly, sensitive latices are frequently formed in the emulsion polymerization of vinyl chloride in the presence of water-soluble catalysts. Particularly coagulation-sensitive are the emulsion polymers, which are suitable for processing to pastes. This sensitivity depends on the formula and increases generally with the size of the primary particles.

For example, a PVC latex can be called shear-sensitive if when it is exposed at 65° C. to a shearing gradient of 1700 sec.$^{-1}$ for 6 minutes, it coagulates.

The solid content of the PVC latices ranges generally between 30% and 50% by weight. PVC and PVC latices also include copolymers with up to 20% by weight, related to the polymer, of other monomers copolymerizable with vinyl chloride.

The degassing process is generally carried out in a special container. In principal, however, it is also possible to install the necessary fittings, such as steam injection nozzle and inclined stirrer, in regular polymerization vessels, thus eliminating the necessity for a second vessel.

Such a special vessel 4 is shown in FIG. 1, where 1 denotes the steam line and injection nozzle which allows the steam to flow tangentially to the vessel wall. An angle $\alpha$ of 60° to 90° from the vertical is suitable, preferably an angle of 70° to 80°. The stirrer 2 is arranged inclined to the vessel wall. The angle of inclination from the vessel wall is generally 20° to 45° and is designated with $\beta$ in the drawing. Preferably, the angle $\beta$ is between 25° and 35°. The stirrer 2 is mounted in a perpendicular plane to the vessel wall. The stirring elements are, for example, propeller, screw or blade stirrers. The vacuum discharge pipe 3 for vinyl chloride and steam is at the top of the vessel 4. An inlet line 5 comes into the vessel at any convenient place.

Furthermore, the letter L denotes the length of the stirrer inside the tank, the letter D the diameter of the tank, the letters $H_1$ and $H_2$ the height of the charge in the tank. It is of advantage, for example, if the ratio of L to D is in the range of 0.3 to 0.1, preferably 0.2. With regard to the height of charge in the tank, it can be pointed out that the lower limit for a height of charge to diameter ratio is $0.3 > H_1$ to $D > 0.1$, particularly 0.2. The upper limit is generally from $1 > H_2$ to $D > 0.2$, preferably 0.3 to 0.5. The stirrer is situated so that effective stirring occurs at the lower limit and the upper limit is at about 50% of the total liquid capacity of the vessel. A float control (not shown) controls the upper limit of the height of the charge in the tank.

FIG. 3 shows another preferred embodiment of the steam injection. It is characterized in that the steam is conducted by line 7 centrally to a baffle plate 8 in the degasification tank. Centrally, in this connection, means not only the exact center of the vessel, but also reasonable deviations therefrom. The degree of filling of the tank is generally 50% at most in degasification. In FIG. 3, D = diameter of the tank, $d_1$ = diameter of the baffle plate, d = diameter of the neck of the tank, h = distance from the tank dome to the baffle plate. The baffle plate 8 can also be covered with a lid 9 of the same diameter as shown in FIG. 3. The gap between the plate 8 and the cover lid 9 is designated with S. For a more detailed description we list here the following conditions which are generally required to be satisfied:

$0.01 < d_1/D < 0.05$, preferably 0.02–0.03
$0.05 < d/D < 0.2$, preferably 0.1
$0.5 < S < 5$, preferably 1–2, mm
$0.02 < h/D < .05$, preferably 0.03.

The process according to the invention is usually carried out as described below.

After the polymerization is completed, the main part of the unpolymerized vinyl chloride is removed from the pressurized autoclave on release of the pressure. Then additional vinyl chloride is withdrawn by means of vacuum pumps. These measures can be carried out both in the polymerization vessel and in a following degasification tank. The steam is then injected and a vacuum is maintained by vacuum-producing apparatus, e.g. water ring pumps. One should attempt to reach and maintain a pressure which corresponds to the steam pressure of water at the prevailing temperature. When the latex is available in the hot state after polymerization, this heat can be utilized. If it is not the case, the desired temperature must be set by heating. In general, temperatures between 50° and 80° C., preferably 55° to 75° C., are selected. The temperature can be kept constant during the degasification or it can be varied. The desired steam pressure corresponding to the temperature is not achieved immediately by steam injection; it takes generally a certain time until the internal pressure has been reduced in the evacuation apparatus so far that the dispersion is kept boiling.

The steam is injected in such a manner that it is directed along the wall of the vessel above the surface of the latex. This can be obtained by the use of conventional injection nozzles tangentially to the autoclave wall and/or by injection through a central baffle plate. Generally amounts of 50 to 500 kg per hour of steam are used, preferably 200 to 300 kg per hour. Normally saturated steam is used. The pressure range of the steam being injected can vary widely, for example, between 1.5 and 15 bar. The temperature of the steam can likewise be varied widely, for example, between 110° and 200° C.

During the injection of the steam and the drawing off of the resulting vinyl chloride/steam mixture by vacuum, the latex is agitated in such a manner that a rolling action is effected in the vessel. This is accomplished by stirring with the inclined stirrer. A stirring speed of 10 to 500 rpm is generally sufficient.

The gas mixture of vinyl chloride and steam drawn off is separated by condensation. The vinyl chloride can be recovered and be used again for the polymerization.

The following examples are illustrative of the practice of the invention without being limitative in any manner.

EXAMPLE 1

A latex produced according to the microsuspension process (prehomogenization process), which contains about 1% emulsifier in the aqueous liquor, is used for the degasification test. It contains 45% PVC with a particle size of 0.1 to 2$\mu$ and a K-value of 70. The vinyl chloride concentration after the polymerization was completed is about 5%, based on the PVC content.

12,000 liters of this latex were discharged into a degasification tank evacuated to about 100 torr. It is stirred with an inclined stirrer with propeller blade at 300 rpm. The temperature is maintained at 62° C. The vaporizing vinyl chloride is removed by water ring pumps. Then steam is injected tangentially to the tank wall (220 kg/h) into the gas space by means of an inclined nozzle. After 30 minutes, an end vacuum of 150 torr has been achieved. The degasification is continued with the latex boiling by injecting steam for another 30 minutes. There is no foaming. The latex contains after this treatment 500 ppm vinyl chloride and is not coagulated. All ppm values are based on the solids content of PVC.

EXAMPLE 2

A latex corresponding to Example 1 is degased under the same conditions but at 50° C. The latex contains 1200 ppm vinyl chloride.

COMPARISON EXAMPLE 1

A latex corresponding to Example 1 is degased at 50° C. under stirring with a straight-standing blade stirrer (30 rpm). After 1½ hours, a vacuum of about 250 torr has been achieved. The latex still contains 20,000 ppm vinyl chloride after this period.

COMPARISON EXAMPLE 2

Comparison Example 1 is repeated, but at a degassing temperature of about 60° C. The degassing time is 3 hours; the end vacuum is about 150 to 200 torr. There is considerable foaming during the process, so that the drawing off of the vinyl chloride must be stopped temporarily so as not to pull foam into the pump. The foam formation also has the effect of elongating the degassing period. The latex still contains 7000 ppm of vinyl chloride.

COMPARISON EXAMPLE 3

The temperature is increased to 65° C., otherwise the procedure corresponds to Comparison Example 2. Foaming is even greater than in the procedure according to Comparison Example 2, so that degassing time of 4 hours is required. The latex contains 4000 ppm vinyl chloride and is coagulated.

EXAMPLE 3

Example 1 is repeated, but with a steam injection apparatus according to FIG. 3. The other conditions remain unchanged. After 25 minutes the degasification is completed. The latex contains 490 ppm vinyl chloride and is not coagulated.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the process for the gentle degasification of coagulation-sensitive PVC latices in a confined space under reduced pressure and stirring at elevated temperatures with steam injection onto the latex surface, the improvement consisting essentially of conducting said degasification at a selected temperature from 50° C. to 80° C. at a pressure corresponding to the boiling pressure of water at the selected temperature, stirring said latex by an inclined stirrer mounted in a perpendicular plane to the vessel wall and inclined from the vertical by an angle $\beta$ of 20° to 45° in a clockwise direction, said inclined stirrer extending beyond the wall of said vessel by the length L said latex surface being between a minimum height $H_1$, and a maximum height $H_2$ in said vessel having a diameter D, where the ratio of L to D is from 0.3 to 0.1, the ratio of the lower limit of $H_1$ is $0.3 > H_1$ to $D > 0.1$, the ratio of the upper limit $H_2$ is $1 > H_2$ to $D > 0.2$, said stirrer being situated so that effective stirring occurs at $H_1$ and $H_2$ is at about 50% of the total liquid capacity of said vessel, whereby a rolling action of said latex in said confined space is effected and introducing said steam into the gas space above said latex but directed along the surface of the confined space.

2. The process of claim 1 wherein said steam is directed along the surface of the confined space at an angle $\alpha$ of from 60° to 90° from the vertical in a clockwise direction.

3. The process of claim 1 wherein said steam is directed in a horizontally circular spray in substantially the center of said confined space to the surface of said confined space.

4. The process of claim 1 wherein said ratio of L to D is 0.2.

5. The process of claim 1 wherein said ratio of the upper limit $H_2$ is $1 > H_2$ to D 0.3 to 0.5.

6. The process of claim 1 wherein said angle $\beta$ is from 25° to 35°.

7. The process of claim 2 wherein said angle $\alpha$ is from 70° to 80°.

8. The process of claim 3 wherein said steam is directed in a horizontally circular spray by means of a circular baffle, parallel to the surface of the latex having a diameter $d_1$ placed at a distance h from the dome of said confined space having a diameter D, said confined space having a neck of diameter d at its top where the following ratios apply:

$0.01 < d_1/D < 0.05$
$0.05 < d/D < 0.2$
$0.02 < h/D < 0.05$

9. The process of claim 8 where the ratio of $d_1$ to D is from 0.02 to 0.03, the ratio of d to D is 0.1 and the ratio of h to D is 0.03.

10. The process of claim 8 wherein said circular baffle has a lid set a distance S thereover and S is from 0.5 to 5 mm.

11. The process of claim 10 wherein S is from 1 to 2 mm.

* * * * *